United States Patent [19]

Dallmann et al.

[11] Patent Number: 5,698,309

[45] Date of Patent: *Dec. 16, 1997

[54] MOLDED BODIES MADE OF POLYESTER CONTAINING COVALENT-BONDED OXIDE PARTICLES

[75] Inventors: Hermann Dallmann, Wiesbaden; Joachim Kinkel, Guldental; Kurt Marquard, Reinheim; Ludwig Pohl, Darmstadt, all of Germany

[73] Assignee: Hoechst Aktiengesellschaft, Germany

[*] Notice: The term of this patent shall not extend beyond the expiration date of Pat. No. 5,494,949.

[21] Appl. No.: 411,641

[22] PCT Filed: Sep. 30, 1993

[86] PCT No.: PCT/EP93/02660

§ 371 Date: Apr. 5, 1995

§ 102(e) Date: Apr. 5, 1995

[87] PCT Pub. No.: WO94/07945

PCT Pub. Date: Apr. 14, 1994

[30] Foreign Application Priority Data

Oct. 5, 1992 [DE] Germany ............... 42 33 396.2
May 19, 1993 [DE] Germany ............... 43 16 814.0

[51] Int. Cl.$^6$ ............... B32B 5/02; C08K 9/06
[52] U.S. Cl. ............... 428/323; 428/328; 428/331; 428/403; 428/405; 428/480; 428/220; 523/212; 523/213
[58] Field of Search ............... 428/220, 323, 428/328, 331, 403, 405, 447, 480; 523/212, 213, 505, 521

[56] References Cited

U.S. PATENT DOCUMENTS

| | | | |
|---|---|---|---|
| 4,176,124 | 11/1979 | Darms et al. | |
| 4,328,041 | 5/1982 | Wilson. | |
| 5,162,155 | 11/1992 | Berndt et al. | 428/405 |
| 5,494,949 | 2/1996 | Kinkel et al. | 523/212 |

Primary Examiner—Marie R. Yamnitzky
Attorney, Agent, or Firm—Connolly & Hutz

[57] ABSTRACT

Moldings, preferably comprising polyester which contains oxide particles which have been subjected to a surface modification with a silylating agent of the formula I

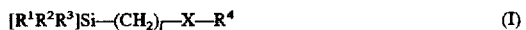

wherein $R^1$ is Cl or alkoxy having 1 to 6 carbon atoms,
$R^2$ and $R^3$ are alkyl having 1 to 6 carbon atoms or $R^1$,
l is a number from 1 to 6,
X is a single bond, O, NH, CONH or NHCONH,
$R^4$ is

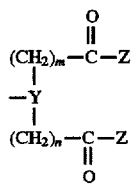

where Y is CH,

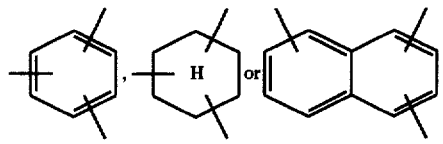

Z is OR or two radicals Z together are —O— or NR and m and n are a number from 0 to 6, or $R_4$ is

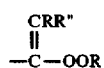

where X is a single bond
and R, R' and R" are H or alkyl having 1 to 6 carbon atoms,
and the use of said moldings are described.

18 Claims, No Drawings

MOLDED BODIES MADE OF POLYESTER CONTAINING COVALENT-BONDED OXIDE PARTICLES

The invention relates to moldings, in particular films, which contain at least one polyester layer and which contain surface-modified oxide particles. The films are preferably single-layer or multilayer monoaxially or biaxially oriented and heat-set films in which at least one layer is predominantly composed of a polyester. This polyester layer contains oxide particles which are modified at their surface so that they are covalently bonded in the polyester matrix.

Owing to their superior properties, such as their tensile strength, their ultimate tensile strength, their modulus of elasticity, their transparency, their chemical and thermal stability and the like, biaxially oriented films of polyester, in particular of polyethylene terephthalate, polyethylene naphthalate or polycyclohexane-dimethanol terephthalate, are used in large amounts in many industrial areas, such as, for example, in the reprographic sector, as a dielectric for capacitors, as substrate films for magnetic recording media, such as, for example, for audio, video and computer tapes and floppy disks, as ribbons for thermal transfer printing, as blocking foils and release films and as packaging material.

For the various fields of use, the polyester films must meet specific requirements, which are usually achieved with the aid of the raw material formulations and/or by means of specific process engineering during their production.

The surface structure of the films is particularly important here because it is critical for the frictional and abrasion behavior during the production and processing of the films.

Films having an extremely smooth surface exhibit poor frictional behavior which has an adverse effect both during their production and during their further processing.

Overcoming or reducing the stated disadvantages by incorporating inorganic and/or organic inert particles having a defined particle size distribution forms part of the prior art. Examples of such inert particles, which may be used alone or in combination, are $CaCO_3$, $TiO_2$, $Al_2O_3$, $ZrO_2$, $BASO_4$, calcium phosphate, kaolin, $SiO_2$ or natural and synthetic silicates.

Owing to their inadequate binding in the polymer matrix, the incorporation of the inert particles is associated with other disadvantages, some of which are serious. In the case of magnetic tapes, the inadequately bound inert particles may be torn out of the surface of the substrate film, for example during repeated use, and may thus adversely affect the electromagnetic properties of the tape to such an extent that complete loss of information may result. In the case of capacitor films, on the other hand, impairment of the dielectric properties may lead to electrical breakdown.

To improve the affinity of the inert particles for the polymer matrix and hence to improve the quality, i.e. the property profile of the moldings produced with the use of these inert particles, it was proposed to subject them to a surface treatment, depending on their chemical composition.

The possibilities of surface modification of carbonate fillers with the aim of influencing the interactions at, in particular, the $CaCO_3$/polymer interfaces are described, for example, in Plaste und Kautschuk [Plastic and Rubber], 37th year, Issue 8/1990, page 269 et seq.

U.S. Pat. No. 3,227,675 describes the treatment of "clays" (kaolins) with organosilicon compounds in order to achieve better binding in a polymer matrix.

DE-A-35 34 143 describes monodisperse $SiO_2$ particles which are preferably intended for chromatographic purposes and whose functional groups present at the surface have been reacted with organotrialkoxysilanes.

A process for modifying synthetic silicate fillers with sulfur-containing organosilicon compounds to improve their binding in vulcanizable rubber blends is described in EP-A-0 177 674.

U.S. Pat. No. 4,567,030 likewise describes monodisperse mixed oxide particles which may be used as "fillers" and whose surfaces are modified with a γ-aminopropyltrimethoxysilane or silanes which contain ethylenically unsaturated groups in order to improve the moisture resistance and the "dispersibility in a resin".

EP-A-0 236 945 describes stable glycol dispersions of oxide particles having a defined shape and particle size, which contain glycol bound to their surface. The films produced using such dispersions are said to have good abrasion resistance.

In practice, it has been found that the measures proposed to date have not led to a radical improvement in the binding of the inert particles in the PET matrix. During the orientation of films, the inert particles are therefore still torn out of the polymer matrix with formation of undesirable voids, the shape and size of which depend substantially on the orientation parameters chosen.

It is therefore the object of the present invention to provide a molding, preferably a monoaxially or biaxially oriented film having at least one layer and a thickness of from 0.5 to 500 µm, which contains uniformly distributed inert particles which, owing to their special surface modification, are bound substantially without voids in the polymer matrix and therefore do not adversely affect the property profile of the film, such as, for example, its abrasion resistance, which may be regarded as a measure of the quality of binding of the particles in the matrix.

This object is achieved by a molding, in particular by a single-layer or multilayer monoaxially or biaxially oriented film having a total thickness of from 0.5 to 500 µm, at least one layer of the film essentially comprising polyester and containing oxide particles which have been treated with a silylating agent of the formula I $$[R^1R^2R^3]Si\text{---}(CH_2)_l\text{---}X\text{---}R^4 \tag{I}$$

wherein $R^1$ is Cl or alkoxy having 1 to 6 carbon atoms, $R^2$ and $R^3$ are alkyl having 1 to 6 carbon atoms or $R^1$, l is a number from 1 to 6, X is a single bond, —O—, —NH—, —COHN— or —NHCOHN— and $R^4$ is

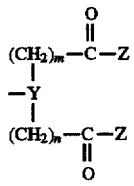

where Y is CH,

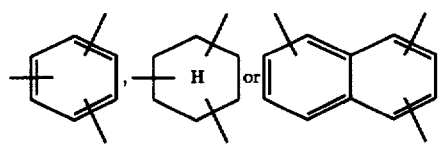

Z is OR or two radicals Z together are —O— or NR and m and n are a number from 0 to 6, or

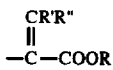

where X is a single bond
and R, R' and R" are H or alkyl having 1 to 6 carbon atoms.

In principle, all solid inorganic oxides which are capable of undergoing a chemical reaction at the particle surface with silylating agents known per se with the formation of covalent element-oxygen-silicon bonds are suitable as base material of the primary oxide particles. A precondition for this is the presence of free or hydrated element-O or element-OH groups at the particle surface. This is true for virtually all metal oxides and some semimetal oxides, such as $SiO_2$, and corresponding mixed systems. Preferred base materials are therefore $SiO_2$, $TiO_2$, $ZrO_2$, $Al_2O_3$ and also $V_2O_5$, $Nb_2O_5$ and mixtures of two or more of the abovementioned oxides. Mixed systems are also to be understood as meaning complex mineral systems, such as silicates, aluminates, aluminosilicates, etc.

The silylating agents of the formula I which are to be used for surface modification of the primary oxide particles have a structure such that they possess functional groups by means of which it is possible to achieve covalent bonding in a polyester. In the formula I, such a group ($R^4$) capable of reacting with polyesters or their components or starting materials is accordingly bonded to the central Si atom of the organosilicon compound via a spacer group comprising 1 to 6 methylene units and a linking unit, which may be a single bond, oxygen or an amino, amido or urethane group. The functional group $R^4$ has a structure such that it contains carboxyl groups or transformation products thereof, such as carboxylic ester, carboxamido and anhydride groups and/or ethylenically unsaturated groups. With regard to incorporation by covalent bonding in the polyester, preferred functional groups $R^4$ are those which are derived from aliphatic, cycloaliphatic or aromatic dicarboxylic acids. Suitable parent aliphatic dicarboxylic acids are those having up to a total of 15 carbon atoms. Malonic acid and succinic acid and the esters, amides or anhydrides thereof are preferred. In the case of the cycloaliphatic and aromatic dicarboxylic acids, the acid groups may be separated from the alicyclic or aromatic ring by up to 6 carbon atoms in each case. Terephthalic acid, isophthalic acid and naphthalenedicarboxylic acid and derivatives thereof are preferred here. Alternatively, the functional group $R^4$ may also be derived from acrylic acid or the acrylates and homologs thereof.

Of the remaining three radicals $R^1$, $R^2$ and $R^3$ on the Si atom of the compounds of the formula I, at least one, preferably two or all three, must be a group which can be eliminated by hydrolysis, such as chlorine or alkoxy having 1 to 6 carbon atoms, otherwise alkyl having 1 to 6 carbon atoms. The capability of hydrolytic elimination makes the compounds of the formula I capable of covalent bonding to the primary oxide particles and hence acting as silylating agents. Some of the silylating agents of the formula I are commercially available while others can be prepared by methods known per se. Important starting materials for the silanes derivatized with carboxylic acids are, on the one hand, mono-, di- or trichlorosilanes or mono-, di- or trialkoxysilanes, such as, for example, chlorodimethylsilane, methyldichlorosilane, trichlorosilane, trimethoxysilane, triethoxysilanes, ethoxydimethylsilane and dimethoxyethylsilane. On the other hand, they are dicarboxylic acids or derivatives, such as, for example, malonic acid, diethyl malonate, succinic acid, succinic anhydride and 2-aminoterephthalic acid.

Examples of silylating agents of the formula I are: diethyl triethoxysilylpropylmalonate, (ethoxydimethylsilylpropyl)-succinic anhydride, diethyl (triethoxysilylmethyl)-succinate and N-(p-dimethoxycarbonylphenyl)-4-(methyldiethoxysilyl)butyramide.

The chemical bonding of the silanes provided with the functional groups to the particle surface is effected either during or after the synthesis of the oxide particles. In the case of synthetic or natural oxides or oxide-containing inert particles, it may also be effected after the processing tailored to the particular intended use of the molding to be prepared from the polyester, said particles either being brought directly into contact with the silylating agents or being treated in a solution of the silylating agent until the surface is completely covered.

The polyester raw material or the molding produced therefrom contains from 0.001 to 20% by weight, preferably from 0.005 to 5% by weight, of the silane-modified oxide or oxide-containing inert particles (based on the weight of the polyester). These particles surface-modified with the silylating agent according to the formula I preferably have a diameter in the range from 0.01 to 20 µm.

The particle size and the particle size distribution of the particles depend on the particular requirements for the molding. For very demanding applications, for example for substrate films for magnetic tapes coated with metal by vapor deposition, spherical, modified oxide particles which have a very narrow particle size distribution and whose quotient of the weight average particle diameter ($D_w$) and the number average particle diameter ($D_n$) is 1.5, preferably $\leq 1.3$, are preferably used. In order to determine ($D_w$) and ($D_n$), refer to U. E. Woods, J. S., I. M. Krieger and P. Pierce, J. of Paint Technology, Vol. 40, No. 527, page 545 et seq. (1968).

The surface-modified oxides or oxide-containing inert particles can be incorporated into the polyester either during its preparation (dispersion route) or immediately before the production of the molding (masterbatch route).

The addition of the inert particles surface-modified with the silanes described during the dispersion route depends on the medium in which the inert particles are dispersed. Dispersions of said particles in glycols may be added at any time during the preparation process. The dispersions of the inert particles in glycols are preferably metered in so that thermal damage to the functional groups bonded to the particles is prevented. In the transesterification process, the metering is therefore preferably effected after the transesterification and melt filtration (turbulent metering) or, as in the case of the direct ester process (PTA process), after a melt viscosity of about 0.30 dl/g has been reached.

Solid dispersions of the surface-modified inert particles, for example in polyalkylene glycols, as described in EP-A-0 406 727, are likewise preferably added after the transesterification or at the beginning of the polycondensation.

Depending on requirements, it is possible to use oxide particles surface-modified only with the silylating agent of the formula I or silane-modified oxide-containing particles having a narrow particle size distribution, mixtures thereof having different particle sizes or mixtures thereof with organic particles which may be crosslinked or cured, as described, inter alia, in DE-A-30 19 073, or with inorganic conventional particles, such as carbonates, sulfates or phosphates of the alkaline earth metals. These additional inert particles may be incorporated into the polyester either together with the specially surface-modified inert particles or separately by the known processes. Alternatively or in addition to the stated conventional inert particles, the catalyst precipitates specifically precipitated during the preparation of the polyesters may also be used.

In the case of the so-called masterbatch route, the specially surface-modified inert particles may be metered into the polyester raw material in the form of highly concentrated polyester chips, either alone or together with other inorganic or organic additives which may be required.

Alternatively to the polyester masterbatches, the specially surface-modified inert particles may also be metered into the base raw material in the form of the masterbatches described in EP-A-0 406 727, during the production of the film.

The choice of the inert particles to be used in each case depends, as stated, on the requirements for the molding to be produced. Thus, inert particles having a refractive index tailored to the polyester matrix, as described, inter alia, in DE-A-42 19 287, are preferred, for example, for optically high-quality moldings, such as, for example, for films for reprographic applications.

In addition to the slip-promoting inert particles, the polyesters of the present invention may additionally contain organic slip agents/nucleating agents, anti-oxidants, heat stabilizers, antistatic agents (for example salts of alkanesulfonic acids or sulfonated polyoxyalkylenes) and the like.

Examples of additives which have an advantageous effect both on the frictional behavior and on the abrasion behavior of polyester films are long-chain monocarboxylic acids and their esters and ester wax salts, such as palmitates, stearates or montanates, polysiloxanes, polyethersiloxanes and polyestersiloxanes, glyceryl esters, etc. The concentration of the slip-promoting organic additives is in the range from 0.005 to 20% by weight, preferably from 0.01 to 5% by weight, based on the polyester.

For the purposes of the invention, homo- and copolycondensates, mixtures of different polyesters and mixtures or blends of polyesters with other polymers and, if required, resins are regarded as polyesters.

The preparation of the polyesters can be carried out both by the transesterification process, for example with the aid of transesterification catalysts, such as, for example, Zn, Mg, Ca, Mn, Li or Ge salts, and by the direct ester process (TPA process), in which antimony compounds are used as polycondensation catalysts and phosphorus compounds as stabilizers. The RSV value of the polyesters is preferably in the range from 0.4 to 1.0 dl/g.

Examples of polyesters are polycondensates of terephthalic acid, isophthalic acid or 2,6-naphthalene-dicarboxylic acid with glycols having 2 to 10 carbon atoms, such as polyethylene terephthalate, polybutylene terephthalate, poly-1,4-cyclohexylene dimethylene terephthalate, polyethylene 2,6-naphthalenedicarboxylate, polyethylene naphthalate/bibenzoate or polyethylene p-hydroxybenzoate.

The polyesters may be composed of up to 50 mol %, in particular up to 30 mol %, of comonomer units, variation in the glycol and/or the acid component being possible. The copolyesters may contain, for example, adipic acid, glutaric acid, succinic acid, sebacic acid, phthalic acid, isophthalic acid, 5-Na-sulfoisophthalic acid or polyfunctional acids, such as trimellitic acid, etc., as the acid component.

The polyester mixtures may comprise polyester homopolymers, polyester copolymers or polyester homo- and copolymers. Examples of these are blends of polyethylene terephthalate/polybutylene terephthalate, polyethylene terephthalate/polyethylene isophthalate or polyethylene isophthalate/5-sodium sulfoisophthalate.

Examples of polymers which the polyester may contain to improve its orientability or its mechanical or optical properties or for obtaining special surface properties of moldings produced therefrom are polyolefin homo- or copolymers, such as polyethylene, polypropylene, poly-4-methylpentene, ethylene/vinyl acetate copolymers, which in turn may be hydrolyzed, ionomers, polyamides, polyacetones, polycarbonates, polysulfones, etc. These substances may be incorporated into the polyester during the preparation of the raw materials or the production of the films.

The moldings according to the invention, in particular single-layer or multilayer films, are produced from the polyester raw material described above. At least one layer of this film is composed essentially of polyester, i.e. at least one layer of this film is composed of the raw material described above, which, as described, contains additives in addition to a polyester or various polyesters.

The films are advantageously produced by the extrusion process, the polyester material containing the specially surface-modified inert particles and, if required, further additives being melted, extruded to give a preliminary film and quenched on a cooling roll, and this film then being oriented in the longitudinal direction and/or transverse direction at temperatures between the glass transition temperature of the polymer and 180° C. with a two-dimensional stretching ratio preferably in the range from 4 to 30, and then being heat-fixed at temperatures between 150° C. and 270° C. The number and sequence of the longitudinal and transverse orientation stages are not specified but depend on the subsequent use of the films. The individual "longitudinal" and "transverse" orientation processes may be carried out in one or more stages. Longitudinal and transverse orientation at the same time (simultaneous orientation) is also possible.

The films resulting from the orientation processes may have increased strength only in one direction (mono-axially oriented), may have balanced mechanical properties in both directions (balanced films) or may have particular strengths in the transverse and/or longitudinal direction (tensilized or supertensilized films).

The films may have one or more layers and may have a symmetrical or asymmetrical structure, and polyesters of different formulations or formulated or unformulated polyesters or those having the same chemical composition but different molecular weights and different viscosities may be combined by coextrusion.

The films according to the invention may also contain from 5 to 50% by weight of regenerated material of the same type.

The films according to the invention have a total thickness of from 0.5 to 500 µm, in particular from 0.5 to 100 µm, particularly preferably from 0.5 to 40 µm.

The surface properties and surface roughnesses of the films can be adapted to the particular requirements by coating one or both sides during their production, for example after the first orientation stage (so-called in-line process) or separately therefrom (off-line process), with solutions or emulsions of polymers, such as, for example, copolyesters, polyurethanes, etc., which in turn may contain inorganic or organic inert particles and/or slip-promoting additives.

In order to improve the properties of the applied layer, the emulsions or solutions may additionally contain organic additives, such as, for example, sodium montanate, fatty esters, silane or siloxane coupling reagents and inorganic additives, such as, for example, colloidal $SiO_2$ or $TiO_2$ particles. The coatings can be applied by the in-line process, i.e. between the orientation stages or after the orientation.

The films having the surface-modified oxide particles or oxide-containing particles may be used both in the industrial sector, such as, for example, for capacitors or magnetic recording media, for reprographic purposes or as release film or blocking foil, and in the packaging sector.

The invention is illustrated in detail below with reference to embodiments.

EXAMPLES

The values stated in the Examples and in Table 1 for the RSV value, the abrasion resistance, the $F_5$ longitudinal value, the modulus of elasticity, the coefficient of friction and the $R_a$ value were determined as follows:

1. RSV value:

The value indicates the reduced specific viscosity and was measured according to DIN 53 728, Sheet 2.

2. Abrasion resistance:

It was tested with the aid of an internally developed apparatus in which a 12.5 mm wide film tape is passed at constant speed and under different web tensions, first over cleaning rollers, then over a stainless steel guide pin and then over two rubber rollers serving as measuring rollers. The loading of the rubber rollers served as a measure of the abrasion resistance of the films. Measuring standards from 1 (very abrasion-resistant) to 6 (very pronounced abrasion) served as comparisons.

3. $F_5$ longitudinal value:

The value indicates the tensile strength of the film at 5% elongation. The measurement was carried out according to DIN 53 455.

4. Modulus of elasticity:

The modulus of elasticity was measured according to DIN 53 457. The $F_5$ value and modulus of elasticity were determined using a type 1445 ZWICK apparatus, the measuring length being 100 mm, the strip width 15 mm and the take-off speed 10 mm/min (modulus of elasticity) or 100 mm/min. The stated values are based on five individual measurements.

5. Coefficient of friction:

The coefficient of friction indicates the slip of the film. It was measured according to DIN 53 375.

6. $R_a$ value:

The $R_a$ value expresses the surface roughness of the film in numerical terms as the arithmetic mean of all distances of the roughness profile R from the center line.

The measurement was carried out according to DIN 4768 by means of the surface measuring device Perthometer SP 6 from Feinprüf GmbH, Göttingen. The stated values are based on six individual measurements, the highest value being omitted from the calculation of the mean. The cut-off was 0.25 mm in each case.

In addition, the average peak-to-valley height was determined by means of the Hommel tester T20S/RP50 at a cut-off of 0.08 µm (DIN 4762/1). Here, the following parameters were chosen:

Lt (length of the surface): 0.48 mm X=400
ZP (width of the surface): 0.4 mm Y=50,000
MB (measuring range): 0.2 mm Z=150
n=50 (number of lines)
Vt=0.05 mm/sec (feed velocity)

Example 1a

Granules of a polyethylene terephthalate which had an RSV value of 0.820 dl/g and contained 2,000 ppm of mono-disperse $SiO_2$ particles distributed uniformly in the matrix, surface-modified with a gluconamide of 3-aminopropyltriethoxysilane and having a mean diameter of 0.5 µm were melted, shaped to given an amorphous preliminary film and cooled on a roller having a surface temperature of about 30° C.

The preliminary film-was heated by means of rollers and first transversely stretched by a factor of 1.05 at 112° C. and then again by a factor of 3.0 at 107° C. in the machine direction and then transversely stretched in a frame by a factor of 3.5 at 95° C. and then fixed at 200° C. The thickness of the final film was 12 µm.

Example 1b

The film was produced according to Example 1a, except that the longitudinal stretching was carried out in two stages, by a factor of 1.5 at 115° C. and then by a factor of 2.8 at 107° C. (stretching method B). The thickness of the final films was 12 µm.

Example 2

A 12 µm thick film was produced according to Example 1b from a polyester raw material which contained 2,000 ppm of monodisperse $SiO_2$ particles surface-modified with diethyl triethoxysilylpropylmalonate and having a mean diameter of 0.5 µm.

Examples 3a and 3b

12 µm thick films were produced according to Examples 1a and 1b, the raw material containing 2,000 ppm of $SiO_2$ particles of the same size which were modified with (ethoxydimethylsilylpropyl)-succinic anhydride.

Examples 4a and 4b

12 µm thick films were produced according to Examples 1a and 1b using $SiO_2$ particles modified with N-(2,5-bis-methoxycarbonylphenyl)-4-(methyldiethoxysilyl)-butyramide and having a mean diameter of 0.5 µm.

Comparative Example

12 µm thick films were produced according to Examples 1a and 1b, unmodified $SiO_2$ particles having a mean diameter of 0.5 µm being used.

For the films obtained, the properties mentioned in Table 1 were determined by means of the stated methods of measurement. The quality of binding of the particles in the matrix was evaluated in each case by means of the abrasion resistance of the films. As is evident from the Examples, the stated surface modification of the $SiO_2$ particles leads to a substantial reduction thereof, substantially independently of the conditions chosen. The surface-modified $SiO_2$ particles are thus better fixed in position, i.e. bound in the PET matrix, in comparison with the unmodified $SiO_2$ particles.

In addition, the film surfaces were etched for 20 minutes in an $O_2$ atmosphere and then for 20 minutes in an argon atmosphere. Scanning electron micrographs of the etched film surfaces were prepared at a magnification of 10,000 so that at least three inert particles were detectable.

To evaluate the quality of the binding of the particles in the matrix, the quotient of the maximum diameter of the void ($D_H$) surrounding the inert particle and of the particle ($D_P$) itself was determined in each case.

The evaluation was based on the mean of at least nine individual values. It was found that the quotient $D_H/D_P$ was $\leq 1.3$ when the described inert particles surface-modified with the silylating agent according to formula I were used, and $\geq 1.5$ when the unmodified particles were used.

The size of the voids surrounding the inert particles was thus substantially reduced by the surface modification described and the binding to the matrix was thus improved so that the abrasion resistances of the films could be increased in the stated manner.

TABLE 1

| | | | Roughness $R_1^{(nm)}$ | | Tensile strength N/mm² | | Modulus of elasticity N/mm² | |
|---|---|---|---|---|---|---|---|---|
| Example No. | Surface resistance modification of the 0.5 μm SiO₂ particles | Orientation | Pertho-meter | Hommel | longitudinal | transverse | longitudinal | transverse |
| Comp. Expt. | Standard | A | 22 | 10 | 107 | 110 | 4257 | 5761 |
| | | B | 16 | 16 | 112 | 121 | 4518 | 5795 |
| 1a | GL | A | 26 | 12 | 107 | 110 | 4257 | 5761 |
| 1b | | B | 29 | 13 | 112 | 121 | 4518 | 5795 |
| 2 | ME | B | 20 | 11 | 107 | 110 | 4257 | 5761 |
| 3a | BA | A | 23 | 10 | 107 | 110 | 4257 | 5761 |
| 3b | | B | 27 | 13 | 112 | 121 | 4518 | 5795 |
| 4a | TE | A | 17 | 9 | 107 | 110 | 4257 | 5761 |
| 4b | | B | 16 | 11 | 112 | 121 | 4518 | 5795 |

Properties of 12 μm balanced PET films as a function of the surface modification of the SiO₂ particles

| | Coefficient of friction | | | | Abrasion resistance | | | |
|---|---|---|---|---|---|---|---|---|
| | Static friction | | Sliding friction | | Web tension | | | DH |
| Example No | I/I | A/A | I/I | A/A | 1000 g | 1500 g | 2000 g | DP |
| Comp. Expt. | 33 | 30 | 28 | 28 | 4 | 6 | 6 | 1.5 |
| | 28 | 29 | 27 | 27 | 4 | 6 | 6 | 1.7 |
| 1a | 27 | 26 | 26 | 25 | 2 | 3 | 3 | 1.3 |
| 1b | 28 | 29 | 28 | 28 | 1 | 2 | 2 | 1.2 |
| 2 | 25 | 27 | 23 | 25 | 1 | 2 | 2 | 1.3 |
| 3a | 26 | 25 | 21 | 22 | 1 | 2 | 2 | 1.2 |
| 3b | 26 | 27 | 27 | 27 | 1 | 2 | 2 | 1.3 |
| 4a | 29 | 24 | 23 | 22 | 1 | 1 | 1 | 1.1 |
| 4b | 27 | 27 | 23 | 27 | 1 | 1 | 2 | 1.1 |

| Orientation method | Longitudinal Orientation $\lambda_1$ | $\lambda_2$ | Transverse Orientation $\lambda_s$ | Fixing °C. |
|---|---|---|---|---|
| A | 1.05 | 3.0 | 3.5 | 200 |
| B | 1.5 | 2.8 | 3.5 | 200 |

GL = Glucoamide of 3-aminopropyltriethoxysilane
ME = Diethyl triethoxysilytpropylmalonate
BA = (Ethoxydimethyhsilylpropyl)succinic anhydride
TE = N-(p-Dimethoxycarbonylphenyl)-(methyldiethoxysilyl)-butyramide
I/I = Inner surface/inner surface
O/O = Outer surface/outer surface

We claim:

1. A molding or shaped article comprising a polyester which contains, based on the weight of the polyester, from 0.005 to 20% by weight of oxide particles which have been subjected to surface modification with a silylating agent of the formula I $$[R^1R^2R^3]Si—(CH_2)_l—X—R^4 \quad (I)$$

wherein $R^1$ is Cl or alkoxy having 1 to 6 carbon atoms, $R^2$ and $R^3$ are alkyl having 1 to 6 carbon atoms or $R^1$, l is a number from 1 to 6, X is a single bond, O, NH, CONH or NHCONH, $R^4$ is

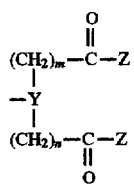

where Y is CH,

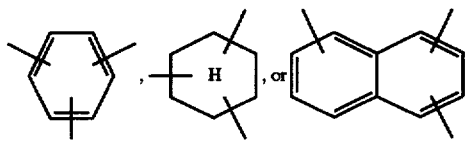

Z is OR or two radicals Z together are —O— or NR and m and n are a number from 0 to 6, or $R^4$ is

where X is a single bond and R, R' and R" are H or alkyl having 1 to 6 carbon atoms.

2. The molding as claimed in claim 1, wherein the polyester is polyethylene terephthalate, polybutylene terephthalate, poly-1,4-cyclohexylene dimethylene terephthalate, polyethylene 2,6-naphthalenedicarboxylate or polyethylene p-hydroxybenzoate.

3. The molding as claimed in claim 2, wherein the RSV value of the polyester is in the range from 0.40 to 1.0 dl/g.

4. The molding as claimed in claim 1, wherein the RSV value of the polyester is in the range from 0.40 to 1.0 dl/g.

5. The molding as claimed in claim 1, wherein an oxide of the oxide particles is $SiO_2$, $TiO_2$, $ZrO_2$, $Al_2O_3$, $V_2O_5$ or $Nb_2O_5$.

6. The molding as claimed in claim 1, wherein said molding is a film.

7. The molding as claimed in claim 6, wherein the film has one or more layers.

8. The molding as claimed in claim 7, wherein the film comprises a plurality of layers.

9. The molding as claimed in claim 8, wherein all layers have been simultaneously extruded.

10. The molding as claimed in claim 8, wherein the film is monoaxially or biaxially oriented.

11. The molding as claimed in claim 7, wherein the film comprises a plurality of layers, each layer consisting essentially of a different polyester.

12. The molding as claimed in claim 6, wherein the film is monoaxially oriented.

13. The molding as claimed in claim 6, wherein the film is biaxially oriented.

14. The molding as claimed in claim 6, wherein the film is heat-set.

15. The molding as claimed in claim 6, wherein the film additionally contains inorganic or organic inert particles.

16. The molding as claimed in claim 6, wherein the film is from 0.5 to 500 µm thick.

17. The molding as claimed in claim 6, wherein the film is coated on one side or on both sides with a solution or dispersion.

18. A molding as claimed in claim 6, wherein said film is a substrate film for a magnetic recording medium, a reprographic film, an electrical film, a blocking foil, a packaging film, or a release film.

* * * * *